US012803461B2

(12) United States Patent
Xu

(10) Patent No.: US 12,803,461 B2
(45) Date of Patent: Nov. 17, 2026

(54) CONTROL METHOD FOR SWITCHING POWER SUPPLY AND SWITCHING POWER SUPPLY

(71) Applicant: Joulwatt Technology Co., Ltd., Hangzhou (CN)

(72) Inventor: Xiangyong Xu, Hangzhou (CN)

(73) Assignee: Joulwatt Technology Co., Ltd., Hangzhou (CN)

( * ) Notice: Subject to any disclaimer, the term of this patent is extended or adjusted under 35 U.S.C. 154(b) by 138 days.

(21) Appl. No.: 18/936,865

(22) Filed: Nov. 4, 2024

(65) Prior Publication Data

US 2025/0158536 A1 May 15, 2025

(30) Foreign Application Priority Data

Nov. 9, 2023 (CN) ........................ 202311489485.0

(51) Int. Cl.
*H02M 7/219* (2006.01)
*H02M 1/00* (2006.01)

(52) U.S. Cl.
CPC ......... *H02M 7/219* (2013.01); *H02M 1/0025* (2021.05); *H02M 1/007* (2021.05)

(58) Field of Classification Search
CPC ..... H02M 7/219; H02M 1/007; H02M 1/0025
USPC ........................................................... 363/78
See application file for complete search history.

(56) References Cited

U.S. PATENT DOCUMENTS

2011/0157924 A1 6/2011 Huynh
2014/0140109 A1 5/2014 Valley
2019/0348920 A1 11/2019 Wong et al.
2023/0275521 A1* 8/2023 Song ....................... H02M 7/04 363/21.14

* cited by examiner

*Primary Examiner* — Tomi Skibinski
(74) *Attorney, Agent, or Firm* — IPro, PLLC

(57) ABSTRACT

The present disclosure provides a control method for a switching power supply and the switching power supply. The switching power supply rectifies an AC voltage to obtain an input voltage. The switching power supply comprises: a front PFC converter and a front controller, and the front controller is used to control the front PFC converter to convert the input voltage into a bus voltage; a post converter and a post controller, wherein the post controller controls the post converter to convert the bus voltage into an output voltage; wherein, the magnitude of the bus voltage is adjusted based on the output voltage and output power. The present disclosure can optimize system efficiency and standby power consumption.

16 Claims, 3 Drawing Sheets

CONTROL METHOD FOR SWITCHING POWER SUPPLY AND SWITCHING POWER SUPPLY

CROSS-REFERENCE TO RELATED APPLICATIONS

This present disclosure claims priority to a Chinese patent application No. 2023114894850, filed on Nov. 9, 2023, and entitled "control method for switching power supply and switching power supply", the entire contents of which are incorporated herein by reference, including the specification, claims, drawings and abstract.

FIELD OF TECHNOLOGY

The present disclosure relates to the field of lighting, more particularly, to an efficient control method for a switching power supply and the switching power supply.

BACKGROUND

In AC-DC applications with an input power greater than 75 W, the input current harmonics need to meet Class D requirements of specification IEC 61000-3B, and the input of the AC-DC converter needs to have a PFC circuit. The most common PFC circuit in the industry is boost converter.

Usually, in order to meet the efficiency requirements of light loads, the PFC circuit is turned off under light loads. Take fast charging applications as an example, the implementation method is shown in FIG. 1. The protocol chip detects the output voltage and output current, and sends a control signal through an optocoupler to enable/disable the PFC circuit, and is connected to a DC-DC converter at the post of the PFC circuit. FIG. 1 illustrates a common isolation converter. The prior art isolation converter detects the output voltage and output current through the secondary side, obtains the enable signal of the PFC circuit based on the output voltage and output current, and transmits the enable signal through optocouplers. However, this solution has two disadvantages:

1. It increases system costs and the number of peripheral components;
2. It is not possible to adjust the output voltage of the PFC circuit based on the output voltage and load status, and it only enables and disables the PFC circuit. For example, in fast charging applications, under 9V output, if the input voltage range of the post DC-DC converter is designed to be narrower, a boost circuit must be used to boost the low voltage input in order to meet the input voltage requirements of the subsequent converter. If the PFC circuit has a fixed voltage output, the overall efficiency of the device will not be high.

SUMMARY OF THE DISCLOSURE

The purpose of the present disclosure is to provide an efficient switching power supply circuit and a control method thereof, which can adaptively enable/disable the PFC circuit and adaptively adjust the output voltage of PFC circuit, so as to optimize system efficiency and standby power consumption.

The present disclosure further provides an efficient control method for a switching power supply, the switching power supply rectifies an AC voltage to obtain an input voltage; the switching power supply comprises: a front PFC converter and a front controller, and the front controller is used to control the front PFC converter to convert the input voltage into a bus voltage; a post converter and a post controller, wherein the post controller controls the post converter to convert the bus voltage into an output voltage; the control method comprises the following steps:

- the front controller samples the feedback voltage denoting the bus voltage from an output feedback terminal of the front PFC converter, and the front controller performs error amplification on the bus voltage and a reference voltage, to control the switching status of the main transistor in the front PFC converter;
- the magnitude of the bus voltage is adjusted based on the output voltage and output power.

Optionally, the reference voltage is adjusted based on the output voltage and output power to regulate the magnitude of the bus voltage.

Optionally, the post controller extracts a first current from the output feedback terminal, and adjusts the first current according to the output voltage and output power to regulate the magnitude of the bus voltage.

Optionally, when the output power is less than the first power threshold, the reference voltage is set as first reference voltage;

- when the output power is greater than or equal to the first power threshold, the reference voltage is set to the larger one of the first reference voltage and the second reference voltage.

Optionally, when the output voltage is less than the first output threshold, the first reference voltage is set as first threshold voltage;

- when the output voltage is greater than the first output threshold, the first reference voltage is positively correlated with the output voltage.

Optionally, when the output voltage is less than the first output threshold, the first reference voltage is set as first threshold voltage;

- when the output voltage rises from the first output threshold to the second output threshold, the first reference voltage rises from the first threshold voltage to the second threshold voltage, and the first reference voltage is positively correlated with the output voltage;
- when the output voltage is greater than the second output threshold, the first reference voltage is set as second threshold voltage.

Optionally, when the input voltage is less than the first input threshold, the second reference voltage is set as first voltage;

- when the input voltage is greater than the first input threshold, set the second reference voltage as second voltage;
- wherein the first voltage is lower than the second voltage.

Optionally, when the output power is less than the first power threshold, the first current is set as first reference current;

- when the output power is greater than or equal to the first power threshold, the first current is set to the larger one of the first reference current and the second reference current;
- wherein the first reference current is set according to the output voltage, and the second reference current is set according to the input voltage.

Optionally, when the output voltage is less than the first output threshold, the first reference current is set as first threshold current;

- when the output voltage is greater than the first output threshold, the first reference current increases with the increase of the output voltage Optionally, when the output voltage is less than the first output threshold, the first reference current is set as first threshold current;

when the output voltage rises from the first output threshold to the second output threshold, the first reference current rises from the first threshold current to the second threshold current, and the first reference current is positively correlated with the output voltage;

when the output voltage is greater than the second output threshold, the first reference current is set to the second threshold current.

Optionally, when the input voltage is less than the first input threshold, set the second reference current as first reference current;

when the input voltage is greater than the first input threshold, set the second reference current as second reference current;

wherein, the first reference current is less than the second reference current.

Optionally, the bus voltage changes in a positive correlation with the input voltage.

Optionally, the front PFC converter comprises a first voltage divider resistor and a second voltage divider resistor; the first voltage divider resistor and the second voltage divider resistor are connected in series at the output terminal of the front PFC converter, and a common connection terminal of the first voltage divider resistor and the second voltage divider resistor is the output feedback terminal of the front PFC converter.

Optionally, the magnitude of the first voltage divider resistor and/or the second voltage divider resistor is regulated based on the output voltage and output power to regulate the bus voltage.

The present disclosure also provides a switching power supply that rectifies an AC voltage to obtain an input voltage, and converts the input voltage to obtain an output voltage, wherein comprising:

a front PFC converter, to convert the input voltage into a bus voltage;

a front controller, to sample the feedback voltage representing the bus voltage of the front PFC converter, and perform error amplification on the feedback voltage and the reference voltage to control the switching state of the main transistor in the front PFC converter;

a post converter, to convert the bus voltage to obtain the output voltage;

a post controller, to control the switching status of the main transistor in the post converter;

wherein the magnitude of the bus voltage is regulated according to the output voltage and the output power.

Optionally, the reference voltage is adjusted based on the output voltage and output power to regulate the magnitude of the bus voltage; or, the post controller extracts a first current from the output feedback terminal and adjusts the first current according to the output voltage and output power to regulate the magnitude of the bus voltage.

Compared with the prior art, the present disclosure has the following advantages: it can adaptively enable/disable the front PFC converter and adaptively adjust the output voltage of the front PFC converter, and when the post converter is an isolation converter, the adjustment function of the present disclosure can be achieved without optocouplers and additional discrete circuits. The present disclosure optimizes system efficiency and standby power consumption; under high voltage input, the function of not enabling the front PFC converter during light load output is achieved; under low voltage input, it achieves: 1) the function of not enabling the front PFC converter under light load, 2) the output voltage of the front PFC converter changes with the output voltage of the switching power supply. It can also achieve the traditional boost following function of the front PFC converter, i.e., during the low voltage input of the switching power supply, the output voltage of the PFC circuit is low, and during the high voltage input of the switching power supply, the output voltage of the PFC circuit is high.

BRIEF DESCRIPTION OF THE DRAWINGS

FIG. 2 is a circuit principle diagram of the switching power supply of the

DETAILED DESCRIPTION OF THE DISCLOSURE

The following will describe the preferred embodiments of the present disclosure in great details by combining with the accompanying drawings. However, the present disclosure is not restricted to these embodiments. The present disclosure convers any replacement, modifications, equivalent methods, and solutions made within the sprits and scope of the present disclosure.

In order to make the public have a thorough understanding, specific details are described in the following preferred embodiments of the present disclosure; however, those skilled in the art can totally understand the present disclosure without these detailed descriptions. s The present disclosure is described in great details in the following paragraphs by referring to the accompanying drawings. It should be noted that the accompanying drawings all use simplified forms and use non-accurate sales, just for the purpose of conveniently and clearly illustrate the embodiments of the present disclosure.

Figure 1:
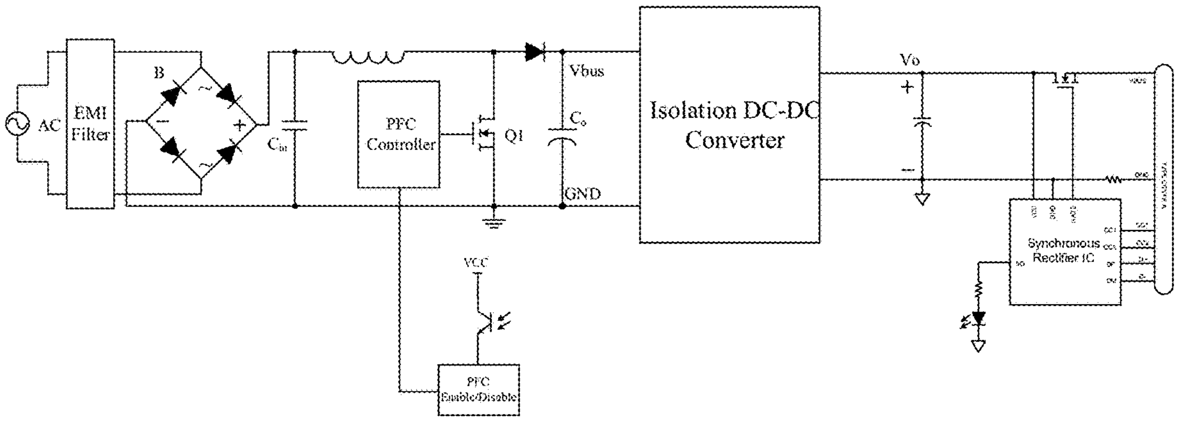
FIG. 1 is a circuit principle diagram of the existing switching power supply.
Figure 2:
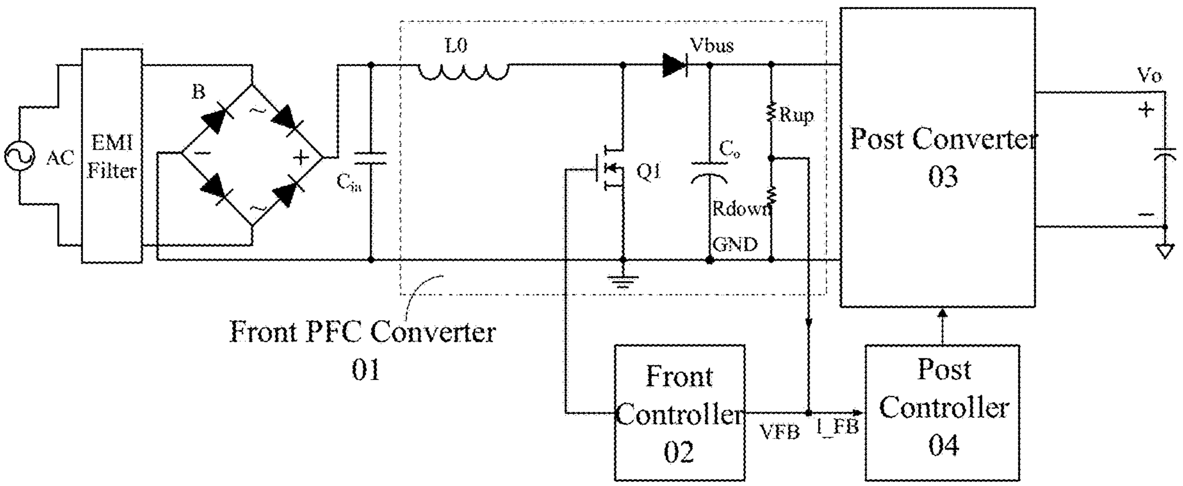

As shown in FIG. 2, it shows the principle diagram of the switching power supply circuit of the present disclosure, which comprises a rectifier circuit 00, a front converter, and a post converter. The switching power supply circuit converts the AC voltage into a DC input voltage Vin through the rectifier circuit 00, and the DC input voltage Vin is converted into an output voltage Vout through the front converter and the post converter. As shown in the drawing, the front converter comprises a front PFC converter 01 and a front controller 02, while the post converter comprises a post converter 03 and a post controller 04. The front PFC converter 01 receives the input voltage Vin, and the front controller 02 controls the switching state of the main transistor Q1 in the front PFC converter, so that the front PFC converter 01 converts the input voltage Vin into the bus voltage Vbus. The front PFC converter 01 is usually a boost converter (Boost circuit) as shown in the drawing. The post converter 03 receives the bus voltage Vbus, and the post controller 04 controls the switching state of the main transistor in the post converter to convert the bus voltage Vbus into the output voltage Vout, wherein the post converter 03 is a DC-DC converter, preferably an isolation converter such as a flyback converter. Wherein, the output feedback terminal of the front PFC converter 01 is connected to the front controller 02 and the post controller 03. The output feedback terminal of the front PFC converter 01 outputs a feedback voltage VFB representing the bus voltage Vbus. The front controller 02 receives the feedback voltage VFB and performs error amplification on the feedback voltage VFB and the reference voltage VREF1 to control the switching state of the main transistor Q1 in the front PFC converter 01, such that the feedback voltage VFB is equal to the reference voltage VREF1. In FIG. 2, the output terminal of the front PFC converter 01 is connected in series with voltage divider resistors Rup and Rdown. The common connection terminal of the voltage divider resistors Rup and Rdown is the output feedback terminal of the front PFC converter. Therefore, there is formula (1): Vbus=VREF1*(Rup+Rdown)/Rdown; the present disclosure adaptively adjusts the bus voltage Vbus based on the output voltage Vo and output power P, enabling/disabling the front PFC converter. There are two ways to adjust the bus voltage:

The first bus voltage regulation method is: according to formula (1), the front controller 02 adjusts the reference voltage VREF1 based on the output voltage Vo and output power P to regulate the bus voltage Vbus;

The second bus voltage regulation method is: the post controller 04 is connected to the output feedback terminal of the front PFC converter 02, and the post controller 04 extracts the first current I_FB from the output feedback terminal of the front PFC converter 02, and there is formula (2): Vbus=VFB*(Rup+Rdown)/Radon+I_FB*Rup; the post controller 04 adjusts the magnitude of the first current I_FB based on the output voltage Vout and output power Po to regulate the bus voltage Vbus output by the front PFC converter 01.

In addition to the above two methods, the magnitude of the bus voltage Vbus can also be adjusted by adjusting the magnitude of the voltage divider resistor, or by simultaneously adjusting the reference voltage VREF, the first current I_FB, and the voltage divider resistor Rup to adjust the bus voltage Vbus. The present disclosure is not limited to using two voltage divider resistors to output feedback voltage VFB and extract the first current I_FB. It is also possible to use more voltage divider resistors or other output feedback circuits to output feedback voltage VFB and obtain the first current I_FB.

Since the output terminal of the front PFC converter 01 is connected to the input terminal of the post converter 03, the bus voltage Vbus is the input voltage of the post converter 03. Based on the bus voltage Vbus, the post converter 03 obtains the output voltage Vo. Therefore, the reference voltage VREF1/first current I_FB can be adjusted according to the output voltage Vout to regulate the magnitude of the bus voltage Vbus; in addition, in order to ensure that the front PFC converter can be enabled during high-power output, it is necessary to adjust the reference voltage VREF1/first current I_FB according to the output power P, and further the magnitude of the bus voltage Vbus is regulated. When the bus voltage Vbus is adjusted by adjusting the reference voltage VREF1/first current I_FB, it can be assumed that the magnitudes of the voltage divider resistors Rup and Rdown are fixed. Similarly, the voltage divider resistors Rup and Rdown can also be adjusted by referring to the above method of adjusting the first current I_FB, so as to further regulate the bus voltage Vbus.

When the main transistor Q1 of the front PFC converter 01 is controlled to keep off by the front controller 02, the inductance L1 in the front PFC converter 01 acts as a wire, and the input and output of the front PFC converter are directly connected, indicating that the front PFC converter 01 is not enabled and has not filtered out input current harmonics; when the front PFC converter 01 boosts the input voltage Vin to obtain the bus voltage Vbus, it indicates that the front PFC converter 01 is enabled and can filter out certain input current harmonics. The present disclosure can adaptively control whether the front PFC converter is enabled or not, as well as adaptively regulate the bus voltage Vbus, optimizing system efficiency and standby power consumption. The post converter of the present disclosure is not limited to isolation converters, but when the post converter is an isolation converter such as a flyback converter, adaptive control of the enable or disable of the front PFC converter and adaptive output voltage regulation can be achieved without optocoupler sampling of the output voltage and additional discrete circuits. In short, the isolation converter adopts the control method of the present disclosure, which has more obvious advantages.

The following will explain how to adjust the bus voltage Vbus by adjusting the first current I_FB and the reference voltage VREF1, based on the working waveform diagram of the present disclosure.

Figure 3A:
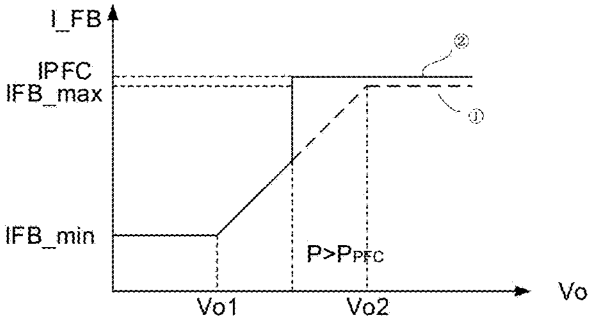
FIG. 3A is a first work waveform of embodiment one of the switching power supply of the present disclosure.

FIG. 3A shows the first working waveform diagram of the first embodiment of the switching power supply circuit. Embodiment one is a solution of adjusting the first current I_FB to regulate the bus voltage Vbus based on the output voltage Vo and output power P. Refer to the drawing, when the magnitude of output power P is not considered, the first current I_FB is set to the first reference current IFB, which follows the variation of the output voltage Vo (as shown in curve 1 in the drawing). When Vo≤Vo1, the first reference current IFB is set to the minimum value, i.e., the first threshold current IFB_min; when Vo1<Vo≤Vo2, the first reference current IFB varies proportionally with the output voltage Vo. When the output voltage Vo rises from Vo1 to Vo2, the first reference current IFB increases from the first threshold current IFB_min to the second threshold current IFB_max; when Vo>Vo2, the first reference current IFB is set at the second threshold current IFB_max; wherein, the first threshold current IFB_min is preferably zero current, or small current slightly larger than the zero current. When the output voltage Vo is low, the post controller 04 can avoid extracting current from the output feedback terminal of the front PFC converter 01, or only extract smaller current, to ensure that the bus voltage Vbus output by the front PFC converter meets the requirements; the second threshold current IFB_max can be set based on the maximum output voltage, or a larger second threshold current IFB_max can be directly set to ensure a higher bus voltage Vbus at high power. However, the setting of the above first current I_FB does not consider the output power P, and it is possible that when the input power is greater than the first power PPFC, such as 75 W, the feedback voltage VFB is relatively low, that is, the bus voltage Vbus is relatively low, which leads to the inability of the front PFC converter to perform boost conversion, that is, the front PFC converter is not enabled, and thus the input current harmonics do not meet the requirements.

Therefore, the present disclosure further needs to adjust the first current I_FB according to the output power P, as shown in FIG. 3A, by setting the second reference current IPFC (as shown in curve 2 in the drawing). When the output power P is less than the first power PPFC, the first current I_FB is set to the first reference current IFB; when the output power P is greater than the first power PPFC, the first current I_FB is set to the larger one of the first reference current IFB and the second reference current IPFC; set the second reference current IPFC based on the maximum input voltage. For example, if the input range of AC input voltage is usually 90 Vac~264 Vac, it can be assumed that the maximum input voltage is 390V. Set the second reference current IPFC based on the maximum input voltage of 390V. The second reference current IPFC set in this way is usually larger than the second reference current IFB_max. When the larger value of the first reference current IFB and the second reference current IPFC is selected, usually the second reference current IPFC is selected; in addition, even if the second reference current IPFC set is slightly lower than the second threshold current IFB_max, selecting a larger second reference current IFB can ensure that the PFC function of the front PFC converter can be enabled under high power and high voltage output. Therefore, when the input power P is greater than the first power PPFC, selecting the maximum value between the second reference current IPFC and the first reference current IFB can ensure that the front PFC converter can enable PFC, so that the input current can eliminate harmonics and ensure that the input current harmonics meet the harmonic standards; when the input power P is less than the first power PPFC, the first current I_FB can be adjusted according to the output voltage Vo, thereby causing the bus voltage Vbus to change with the output voltage Vo. When the high voltage input is lightly loaded (the output power is low), the PFC converter is not enabled.

Figure 3B:
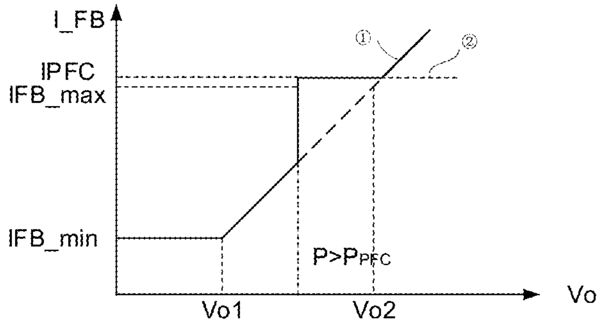
FIG. 3B is second work waveform of embodiment one of the switching power supply of the present disclosure.

FIG. 3B shows the second working waveform diagram of embodiment one of the switching power supply circuit. It differs from the waveform diagram shown in FIG. 3A in the setting way of the first reference current IFB. When Vo≤Vo1, the first reference current IFB is set at the minimum value, i.e., the first threshold current IFB_min; When Vo>Vo1, the first reference current IFB varies proportionally with the output voltage Vo. This embodiment does not need to set the upper limit of the first reference current IFB based on the output voltage Vo, and also can ensure that the front PFC converter operates at high power, meeting the requirements of the input current harmonic standard.

Figure 3C:
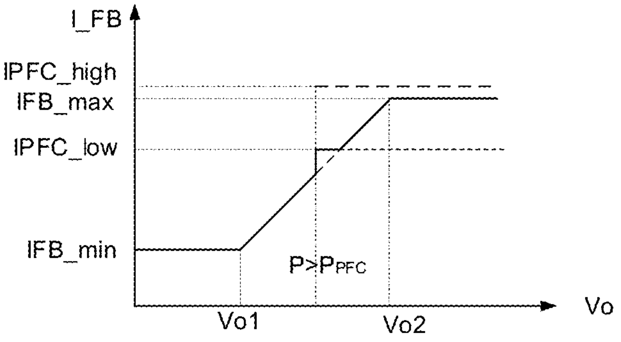
FIG. 3C is a third work waveform of embodiment one of the switching power supply of the present disclosure.

FIG. 3C shows a third working waveform diagram of embodiment one of the switching power supply circuit. Based on the waveform shown in FIG. 3A, the first current I_FB is adjusted according to the input voltage Vin. When the low voltage input, i.e. the input voltage Vin, is less than the first input threshold, the second reference current IPFC is set as the first reference current IPFC_min. When the high voltage input, i.e. the input voltage Vin, is greater than the first input threshold, the second reference current IPFC_max is set as the second reference current IPFC_max, wherein the second reference current IPFC_max is greater than the first reference current IPFC_min. Similarly, when the output power P is less than the first power PPFC, the first current I_FB is set to the first reference current IFB; when the output power P is greater than or equal to the first power PPFC, the first current I_FB is set to the larger value of the first reference current IFB and the second reference current IPFC. The setting method of the first reference current IFB is described in FIG. 3A. When the second threshold current IFB_max is set for the first reference current IFB, the traditional front PFC converter can achieve the function of boost following by setting the second reference current IPFC_max greater than the second threshold current IFB_max, that is, the output bus voltage Vbus of the PFC converter is low at the low voltage input, while the output bus voltage Vbus of the PFC converter is high at the high voltage input. Specifically, in low-power output, the front PFC converter is not enabled, and the input and output terminals of the front PFC converter are directly connected. The bus voltage Vbus output by the front PFC converter changes positively with the input voltage Vin; at high power output, since the second reference current IPFC_max is greater than the second threshold current IFB_max, according to the above relevant illustration, it is possible to achieve high bus voltage Vbus under high voltage input and low bus voltage Vbus under low voltage input, realizing the boost following function of traditional boost converters.

Figure 4A:
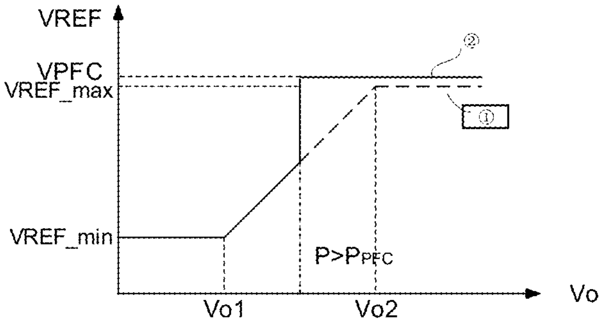
FIG. 4A is a first work waveform of embodiment two of the switching power supply of the present disclosure.
Figure 4B:
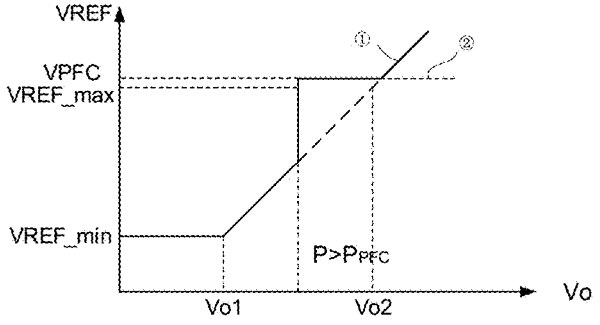
FIG. 4B is second work waveform of embodiment two of the switching power supply of the present disclosure.
Figure 4C:
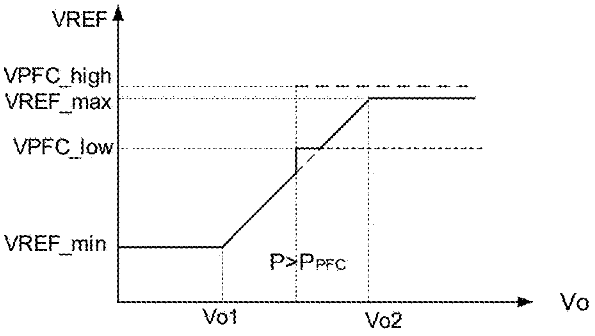
FIG. 4C is a third work waveform of embodiment two of the switching power supply of the present disclosure.

FIGS. 4A, 4B, and 4C show three working waveform diagrams of embodiment two of the switching power supply circuit respectively. The adjustment principle of the reference voltage VREF is the same as that of the first current IFB. FIG. 4A refers to FIG. 3A, when the output power P<PPFC, the reference voltage VREF is set to the first reference voltage. When P>PPFC, the reference voltage VREF is set to the larger one of the first reference voltage and the second reference voltage VPFC. The first reference voltage follows the output voltage Vo. When Vo<Vo1, the first reference voltage is VREF_min. When Vo1<Vo<Vo2, the first reference voltage varies with the output voltage Vo in a positive correlation. When Vo>Vo2, the first reference voltage is set to VREF_max; the second reference voltage VPFC can be larger or slightly smaller than VREF_max. FIG. 4B refers to FIG. 3B, and it differs from FIG. 4A in that when Vo>Vo2, the first reference voltage still varies in positive correlation with the output voltage Vo, and the first reference voltage is not set to a fixed threshold. FIG. 4C refers to FIG. 3C, and based on FIGS. 4A and 4B, a second reference voltage needs to be set according to the magnitude of the input voltage Vin, which will not be further described here.

By the analysis of the above waveform diagrams, the present disclosure achieves the function of disabling the PFC converter under light load under high voltage input; under low voltage input, it can also achieve the function of not enabling the light load PFC converter, and enable the output bus voltage Vbus of the PFC converter to vary with the output voltage Vo; in addition, by setting the second reference current IPFC_max to be greater than the second threshold current IFB_max, the traditional PFC converter can also achieve the function of boost following; The above analysis indicates that the present disclosure can adaptively enable/disenable PFC converters and adaptively regulate the output voltage of PFC converters, thereby optimizing system efficiency and reducing overall power consumption.

Figure 5:
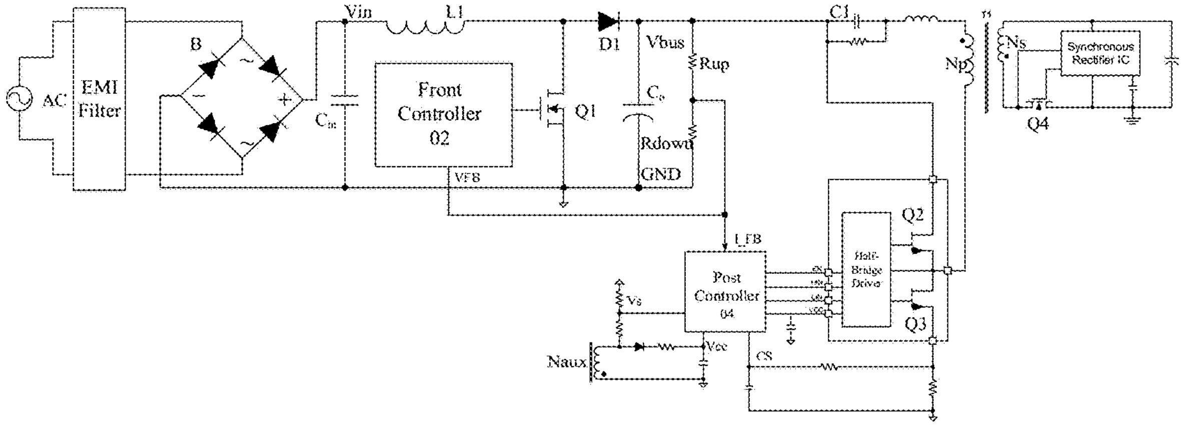
FIG. 5 is a principle diagram of an embodiment of the switching power supply of the present disclosure.

FIG. 5 shows the principle diagram of an embodiment of the switching power supply circuit of the present disclosure. In the embodiment, the front PFC converter is a boost circuit, and the AHB flyback circuit is taken as an example of the post converter. The boost circuit comprises a first inductor L1, a first switch transistor Q1, a rectifier transistor D1, and a front output capacitor Co. The first switch transistor Q1 is the main transistor of the front PFC converter. The first input terminal of the first inductor L1 receives the rectified input voltage Vin, and its second input terminal is connected to the common connection terminal of the first switch transistor Q1 and the rectifier transistor D1. The negative terminal of the rectifier transistor D1 is connected to the output capacitor Co, as well as the voltage divider resistors Rup and Rdown. The voltage divider resistors Rup and Rdown are connected in parallel with the output capacitor Co after they are connected in series. The voltage of the output capacitor Co is the bus voltage Vbus. The front controller 02 receives the feedback voltage VFB output from the junction of the voltage divider resistor Rup and Rdown, and amplifies the error between the reference voltage VREF1 and the feedback voltage VFB to control the switching state of the first switch transistor Q1.

The flyback converter 03 comprises a second switch transistor Q2, a third switch transistor Q3, a first capacitor C1, a transformer T1, an auxiliary winding Naux, and a rectifier transistor Q4. The third switch transistor Q3 is the main transistor of the flyback converter. The second switch transistor Q2, the primary winding Np of transformer T1, and the first capacitor C1 are connected to form a resonant circuit, and the third switch transistor Q3 is connected to the primary winding Np. The secondary winding Ns of transformer T1 is connected to rectifier transistor Q4, and the output voltage Vo is obtained on the secondary edge of transformer T1. By sampling the auxiliary winding Naux voltage, the sampling voltage Vs is obtained or the supply voltage VCC is obtained to obtain the output voltage Vo. Take obtaining the output voltage based on the supply voltage VCC as an example, Vo=Vcc*Ns/Naux; in addition, the output current Io can be obtained based on the peak current Ipeak of the primary edge winding and the duty cycle T1/Ts of the excitation inductance current, Io=0.5*Ipeak*Np/Ns*T1/Ts, wherein T1 can be obtained based on the waveform of the sampled voltage Vs; in addition, the input voltage Vin obtained by rectifying the AC voltage is used to calculate the output power P based on the input voltage Vin and output voltage Vo, and the magnitude of the first current I_FB is further controlled based on the output power P. The post converter 03 of the present disclosure uses an isolation flyback converter, which can adaptively achieve PFC function enabling/disabling and adaptive bus voltage Vbus regulation without optocouplers and additional discrete circuits. This not only saves system costs and the number of peripheral devices, but also optimizes system efficiency and standby power consumption.

Although the above embodiments have been separately explained and elaborated, some common technologies involved can be replaced and integrated among the embodiments in the eyes of those of ordinary skill in the art. If there is any content that is not explicitly recorded in one embodiment, reference can be made to other recorded embodiment.

The above implementation methods do not constitute limitation on the protection scope of the technical solution. Any modifications, equivalent substitutions, and improvements made within the spirit and principles of the above implementation shall be included within the protection scope of the technical solution.

What is claimed is:

1. A control method for a switching power supply, wherein the switching power supply rectifies an AC voltage to obtain an input voltage; the switching power supply comprises: a front PFC converter and a front controller, and the front controller is used to control the front PFC converter to convert the input voltage into a bus voltage; a post converter and a post controller, wherein the post controller controls the post converter to convert the bus voltage into an output voltage; the control method comprises:

sampling a feedback voltage representing the bus voltage from an output feedback terminal of the front PFC converter by the front controller, and performing error amplification on the bus voltage and a reference voltage by the front controller, to control a switching status of a main transistor in the front PFC converter;

regulating a magnitude of the bus voltage based on the output voltage and an output power, wherein when the output power is less than a first power threshold, the reference voltage is set as a first reference voltage;

when the output power is greater than or equal to the first power threshold, the reference voltage is set to the larger one of the first reference voltage and a second reference voltage.

2. The control method for the switching power supply of claim 1, wherein the reference voltage is adjusted based on the output voltage and output power to regulate the magnitude of the bus voltage.

3. The control method for the switching power supply of claim 1, wherein the post controller extracts a first current from the output feedback terminal, and adjusts the first current according to the output voltage and output power to regulate the magnitude of the bus voltage.

4. The control method for the switching power supply of claim 3, wherein:

when the output power is less than a first power threshold, the first current is set as a first reference current;

when the output power is greater than or equal to the first power threshold, the first current is set to the larger one of the first reference current and a second reference current;

wherein the first reference current is set according to the output voltage, and the second reference current is set according to the input voltage.

5. The control method for the switching power supply of claim 4, wherein: when the output voltage is less than a first output threshold, the first reference current is set as a first threshold current;

when the output voltage is greater than or equal to the first output threshold, the first reference current increases with the increase of the output voltage.

6. The control method for the switching power supply of claim 5, wherein: when the output voltage is less than the first output threshold, the first reference current is set as the first threshold current;

when the output voltage rises from the first output threshold to a second output threshold, the first reference current rises from the first threshold current to a second threshold current, and the first reference current is positively correlated with the output voltage;

when the output voltage is greater than the second output threshold, the first reference current is set to the second threshold current.

7. The control method for the switching power supply of claim 6, wherein:

when the input voltage is less than a first input threshold, set the second reference current as the first reference current;

when the input voltage is greater than or equal to the first input threshold, set the second reference current as the second reference current;

wherein, the first reference current is less than the second reference current.

8. The control method for the switching power supply of claim 7, wherein the bus voltage changes in a positive correlation with the input voltage.

9. The control method for the switching power supply of claim 1, wherein when the output voltage is less than a first output threshold, the first reference voltage is set as a first threshold voltage;

when the output voltage is greater than or equal to the first output threshold, the first reference voltage varies positively with the output voltage.

10. The control method for the switching power supply of claim 9, wherein when the input voltage is less than a first input threshold, the second reference voltage is set as a first voltage;

when the input voltage is greater than the first input threshold, set the second reference voltage as a second voltage;

wherein the first voltage is lower than the second voltage.

11. The control method for the switching power supply of claim 10, wherein the bus voltage changes in a positive correlation with the input voltage.

12. The control method for the switching power supply of claim 1, wherein when the output voltage is less than a first output threshold, the first reference voltage is set as a first threshold voltage;

when the output voltage rises from the first output threshold to a second output threshold, the first reference voltage rises from the first threshold voltage to a second threshold voltage, and the first reference voltage is positively correlated with the output voltage;

when the output voltage is greater than the second output threshold, the first reference voltage is set as the second threshold voltage.

13. The control method for the switching power supply of claim 1, wherein: the front PFC converter comprises a first voltage divider resistor and a second voltage divider resistor; the first voltage divider resistor and the second voltage divider resistor are connected in series at an output terminal of the front PFC converter, and a common connection terminal of the first voltage divider resistor and the second voltage divider resistor is the output feedback terminal of the front PFC converter.

14. The control method for the switching power supply of claim 13, wherein a magnitude of the first voltage divider resistor and/or the second voltage divider resistor is regulated based on the output voltage and output power to regulate the bus voltage.

15. A switching power supply that rectifies an AC voltage to obtain an input voltage, and converts the input voltage to obtain an output voltage, comprising:

a front PFC converter, to convert the input voltage into a bus voltage;

a front controller, to sample a feedback voltage representing the bus voltage from an output feedback terminal of the front PFC converter, and perform error amplification on the feedback voltage and a reference voltage to control a switching state of a main transistor in the front PFC converter;

a post converter, to convert the bus voltage to obtain the output voltage;

a post controller, to control a switching status of a main transistor in the post converter;

wherein a magnitude of the bus voltage is regulated according to the output voltage and an output power, when the output power is less than a first power threshold, the reference voltage is set as a first reference voltage;

when the output power is greater than or equal to the first power threshold, the reference voltage is set to the larger one of the first reference voltage and a second reference voltage.

16. The switching power supply of claim 15, wherein the reference voltage is adjusted based on the output voltage and output power to regulate the magnitude of the bus voltage; or, the post controller extracts a first current from the output feedback terminal and adjusts the first current according to the output voltage and output power to regulate the magnitude of the bus voltage.

* * * * *